United States Patent
Machado et al.

(10) Patent No.: US 11,026,438 B2
(45) Date of Patent: Jun. 8, 2021

(54) CONFECTIONERY PRODUCT AND METHOD OF MAKING

(71) Applicant: THE HERSHEY COMPANY, Hershey, PA (US)

(72) Inventors: Peter Machado, Harrisburg, PA (US); Julie Hickey, Hummelstown, PA (US); Yvette Pascua Cubides, Palmyra, PA (US)

(73) Assignee: THE HERSHEY COMPANY, Hershey, PA (US)

( * ) Notice: Subject to any disclaimer, the term of this patent is extended or adjusted under 35 U.S.C. 154(b) by 476 days.

(21) Appl. No.: 15/121,478

(22) PCT Filed: Feb. 27, 2015

(86) PCT No.: PCT/US2015/017913
§ 371 (c)(1),
(2) Date: Aug. 25, 2016

(87) PCT Pub. No.: WO2015/131006
PCT Pub. Date: Sep. 3, 2015

(65) Prior Publication Data
US 2016/0360768 A1     Dec. 15, 2016

Related U.S. Application Data

(60) Provisional application No. 61/945,312, filed on Feb. 27, 2014.

(51) Int. Cl.
| | | |
|---|---|---|
| A23G 3/34 | (2006.01) | |
| A23G 3/54 | (2006.01) | |
| A23G 3/40 | (2006.01) | |
| A23G 3/44 | (2006.01) | |
| A23G 3/48 | (2006.01) | |

(52) U.S. Cl.
CPC ........... *A23G 3/0072* (2013.01); *A23G 3/007* (2013.01); *A23G 3/34* (2013.01); *A23G 3/40* (2013.01); *A23G 3/44* (2013.01); *A23G 3/48* (2013.01); *A23G 3/54* (2013.01); *A23V 2002/00* (2013.01)

(58) Field of Classification Search
CPC ........ A23G 3/007; A23G 3/0072; A23G 3/40; A23G 3/44; A23G 3/48; A23G 3/54; A23G 3/34
USPC ................................................ 426/660, 103
See application file for complete search history.

(56) References Cited

U.S. PATENT DOCUMENTS

| | | | |
|---|---|---|---|
| 1,829,568 A * | 10/1931 | Messer ................ | A23G 3/2023 426/282 |
| 4,204,411 A | 5/1980 | Jeanson | |
| 4,426,402 A | 1/1984 | Kaupert | |
| 4,517,205 A | 5/1985 | Aldrich | |
| 4,542,028 A | 9/1985 | Butcher et al. | |
| 4,679,496 A | 7/1987 | Simelunas et al. | |
| 4,847,098 A * | 7/1989 | Langler .................. | A23L 21/12 426/102 |
| 6,099,880 A * | 8/2000 | Klacik ................. | A23G 3/2015 426/249 |
| 6,183,799 B1 | 2/2001 | Wu et al. | |
| 6,406,732 B1 | 6/2002 | Lee et al. | |
| 6,508,642 B1 | 1/2003 | Aasted | |
| 2002/0058102 A1* | 5/2002 | Makela ................ | A23G 3/0252 426/660 |
| 2002/0168457 A1 | 11/2002 | Aasted | |
| 2003/0054071 A1 | 3/2003 | Wu et al. | |
| 2003/0075830 A1 | 4/2003 | Sollich | |
| 2003/0152677 A1 | 8/2003 | Rabinovitch et al. | |
| 2006/0034976 A1* | 2/2006 | Cotten ................. | A23G 3/0025 426/103 |
| 2007/0196548 A1 | 8/2007 | Schmidt et al. | |
| 2012/0237665 A1* | 9/2012 | Wang ................... | A23G 1/0016 426/631 |

FOREIGN PATENT DOCUMENTS

| | | |
|---|---|---|
| DE | 1955056 A1 | 5/1975 |
| DE | 103 45 933 A1 | 4/2005 |
| DE | 10345933 A1 | 4/2005 |
| DE | 10 2006 040 922 B3 | 10/2007 |
| EP | 0653285 A1 | 5/1995 |
| EP | 1306012 B1 | 7/2007 |
| EP | 2018811 A1 | 10/2009 |
| EP | 1778020 B1 | 3/2012 |
| GB | 1483614 | 8/1977 |
| JP | 2003210114 | 7/2003 |
| JP | 2006055019 | 3/2006 |
| WO | 2012125397 A2 | 9/2012 |

* cited by examiner

*Primary Examiner* — Jyoti Chawla
(74) *Attorney, Agent, or Firm* — McNees Wallace & Nurick LLC

(57) ABSTRACT

Confectioneries and methods of making confectioneries are disclosed in which a confectionery composition is deposited into a mold or a stamped confectionery shell. The deposited composition may be a monodeposit of a single composition or a co-deposit of two different compositions of differing textures, such as a hard candy and a fat-based component commingled to form a laminate.

24 Claims, 1 Drawing Sheet

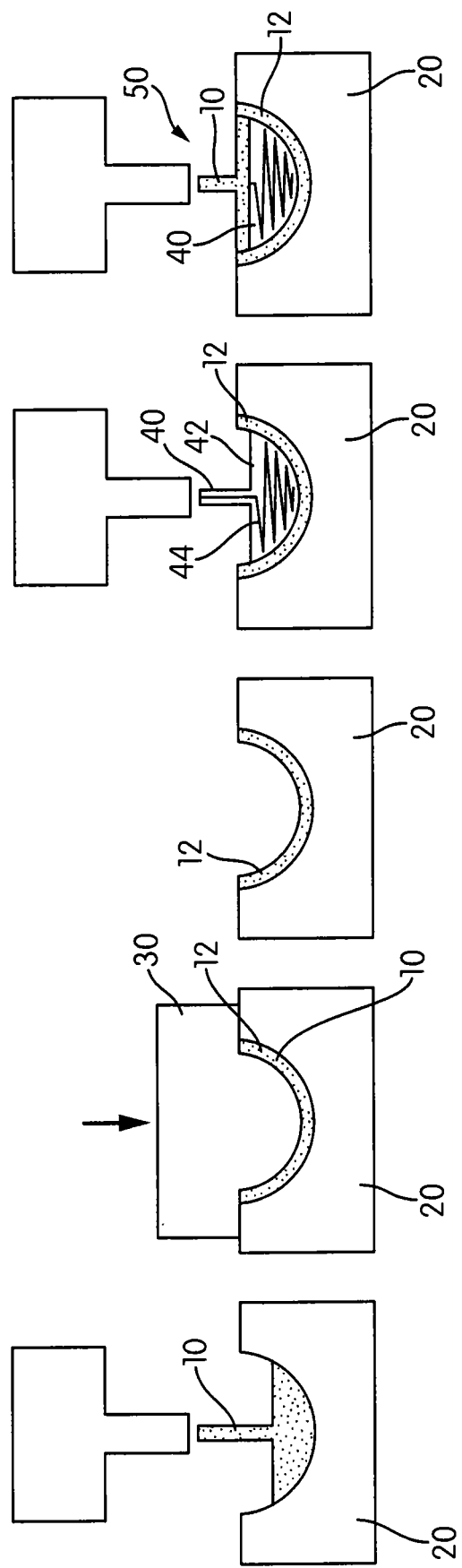

CONFECTIONERY PRODUCT AND METHOD OF MAKING

CROSS-REFERENCE TO RELATED APPLICATION

This application claims the benefit of and priority to U.S. Provisional Patent Application No. 61/945,312 filed on Feb. 27, 2014, which is hereby incorporated by reference in its entirety.

FIELD OF THE INVENTION

This application is directed to a confectionery product. More particularly, the present invention is directed to a multi-textured confectionery product and methods of making the same.

BACKGROUND OF THE INVENTION

Hard candy, a well-known class of confectionery, is a popular sweet. Despite its popularity, the rigorous temperatures associated with hard candy manufacture mean that these candies traditionally have less variety of shape and other features. Challenges are also present in achieving a premium appearance with many hard candies.

Additionally, current methods of forming hard candy limit the amount of filling which may be provided within the hard candy. Typically, these hard candies are limited to about 25% filling. Current methods also generally include multiple processing steps that increase equipment footprint and decrease day to day product consistency.

Continuing improvements are of interest in expanding the variety of candy products available to consumers.

BRIEF DESCRIPTION OF THE INVENTION

In one embodiment a method of forming a confectionery product comprises providing a first confectionery mass comprising a molten hard candy composition, providing a second confectionery mass of a composition other than a molten hard candy composition, co-depositing the first and second confectionery masses as a commingled stream into a cavity to form overlapping layers of the confectionery masses, cooling the co-deposited masses in the cavity to form the confectionery and removing the confectionery from the cavity.

In some embodiments, the cavity is a mold, such that the method involves co-depositing directly into the mold to form a confectionery product free of a shell.

In other embodiments, the cavity is a cooked sugar confectionery shell. In some embodiments in which the co-deposition is into the cooked sugar confectionery shell, the shell is a stamped shell formed to an engineered thickness by the steps of providing a flowable or pliable cooked sugar mass, depositing the cooked sugar mass into a mold cavity, inserting a stamp into the cooked sugar mass in the mold cavity to form a shell and cooling the cooked sugar mass to harden the shell.

Confectioneries made according to the methods described herein are also disclosed.

According to one embodiment, a confectionery comprises a cooked sugar confectionery shell and a filling within the shell, the filling comprising commingled layers of a hard candy and a fat-based confectionery mass.

According to yet another embodiment, a confectionery comprises a shell, the shell formed from a composition selected from the group consisting of high boiled sugar mass, high boiled glassy candy, and soft chew material, the shell having a thickness between 0.5 and 3 mm. The confectionery further comprises a filling formed a confectionery composition different from the shell composition.

Among the advantages of exemplary embodiments is that a confectionery is provided that provides an eatable hard candy containing a dual-textured center that creates a new product that delivers an enhanced eating experience.

Another advantage of exemplary embodiments is that the stamped sugar confectionery shell provides an ability to fill the confectionery with at least 40% by weight of a confectionery filling.

A further advantage of exemplary embodiments is an ability to co-deposit a hard candy composition and a confectionery mass to form a laminate confectionery product for use as a filling or as the confectionery product itself.

Yet another advantage of exemplary embodiments is an ability to more quickly form a confectionary shell while controlling shell thickness.

Still another advantage of exemplary embodiments is an ability to form a confectionery shell having a decreased thickness.

Other features and advantages of the present invention will be apparent from the following more detailed description of exemplary embodiments that illustrate, by way of example, the principles of the invention.

BRIEF DESCRIPTION OF THE DRAWINGS

FIG. 1 schematically illustrates the manufacture of a filled stamped shell confectionery in accordance with exemplary embodiments.

Wherever possible, the same reference numbers will be used throughout the drawings to represent the same parts.

DETAILED DESCRIPTION OF THE INVENTION

Exemplary embodiments are directed to a deposited sugar confectionery provided as a thin shell of a cooked sugar mass that is filled with a confectionery of a different texture, and preferably in which the filling is a co-deposited confectionery that combines a cooked sugar mass and a fat mass in co-mingled layers in a laminate-type structure. Although discussed primarily with respect to stamped shells formed of a hard (high boil) candy, the invention is not so limited and other sugar confectionery materials may also be used in creating the cooked sugar mass for forming the shell, including, for example, soft chews, soft crème mass, sugar alcohols (e.g. xylitol), or a combination thereof.

FIG. 1 schematically illustrates a stepwise manufacturing method of a confectionery in accordance with one embodiment of the invention in which the confectionery is a fully enclosed filled stamped shell. In the illustrated embodiment, the confectionery is manufactured by first depositing a predetermined volume of a cooked sugar mass 10 such as a hard candy or high boiled candy composition in a molten or still pliable form into a mold 20. A stamp 30 is then inserted into the mold 20, forcing the cooked sugar mass 10 into a void between the stamp 30 and the sidewalls of the mold 20 to form a shell 12. The stamp 30 may be thermally controlled (i.e. chilled) so that the act of stamping speeds up solidification of the shell 12 contemporaneously with shell shaping and/or formation. Next, the stamp 30 is removed, leaving behind the solidified formed/stamped shell 12 still in the mold 20. Thereafter, a filling 40 is applied, followed by closing the shell 12 with, for example, application of another amount of cooked sugar mass 10 to form the final confectionery 50 that can then be removed from the mold 20 for packaging and consumption.

It will be appreciated that various embodiments may omit one or more of these steps depending upon the type of confectionery that is desired. For example, the confectionery product could consist of just the stamped shell and filling without a subsequent deposit for closure, leaving the filling exposed for view by the consumer. Alternatively, the shell and closure could be omitted entirely, with deposition of the filling composition directly into the mold for removal after filling such that the confectionery consists solely of the filling composition. While FIG. 1 depicts comingled layers 42, 44 as the filling 40, other center fill options (monodeposit, nut bits, etc.) are possible.

For embodiments in which a shell is employed, the shells may be formed by any suitable method, but preferably is formed using a mold as shown in the schematic illustrated in FIG. 1. Any molds employed in forming the stamped shell are preferably high temperature thermoplastic or elastomeric molds that can withstand the thermal stress of receiving the molten or pliable cooked sugar mass. The use of such molds also helps enable subsequent removal of the shell from the molds without the use of a pin, which leaves a visible feature on the formed hard candy seen in many traditional solid hard candy products from the use of more traditional aluminum or other metallic molds. It will be appreciated however, that aluminum or metallic molds may also still be employed. Regardless of the type of mold used, it may be desirable to use a release agent as are known in the art on the surface of the mold to aid in the eventual release of the shell from the mold. Whether or not a release agent is used may depend in part on the recipe of the specific hard candy or other cooked sugar mass used for the shell, as well as the mold type.

The composition for forming the shell may be any desired formulation employing basic ingredients as are known in the art for forming a confectionery of a cooked sugar mass, in addition to any others desired for a particular recipe or visual effect. The moisture content of the cooked sugar mass of the stamped shell generally ranges from 1% to 12% by weight, with the specific range of moisture content typically dependent upon the specific type of cooked sugar mass employed. Exemplary cooked sugar mass shell compositions include hard candies, high boil candies, soft crème mass, sugar alcohols (e.g. xylitol), soft chews, caramels, and combinations thereof. Generally, the composition includes sugar (e.g., sucrose) boiled with water and glucose (to reduce premature crystallization and obtain a clear glass effect upon cooling), although other sweeteners, such as sorbitol may also be included. In some embodiments, the composition is boiled, typically at least to the hard crack stage, to ensure a brittle, hard candy upon cooling to room temperature, having a moisture content of less than 5% by weight. Other ingredients such as coloring, flavorings and other additives may be included as well.

In some embodiments, the cooked sugar mass may be a high boiled caramel, in which condensed and/or evaporated milk or cream is added along with butter, salt, and other traditional caramel making ingredients to the sugar and glucose. The moisture content of high boiled caramel or other hard candy is typically, by weight, between 2.3 and 4.7%, preferably between 3.0 and 3.5%, and more preferably between 3.2 and 3.4%. In another embodiment, high boiled glassy candy includes a moisture content of between 1 and 2%. Alternatively, for stamped shells formed from a soft chew material, the moisture content may be as high as between 8.0 and 12.0% by weight, or higher. For example, for a soft crème mass, the moisture content typically includes between 6.2 and 9.2%, preferably between 6.7 and 8.3%, and more preferably between 6.7 and 8.0%, by weight. Other stamped shells, including those formed from sugar alcohols such as xylitol, typically include a moisture content of between 1.55 and 3.5%, preferably between 2 and 3%, by weight.

The exterior of the shell may be imparted with a design to enhance premium appearance and increase consumer appeal. The shell design may be created as a result of features (shapes, letters, etc.) incorporated into the mold and/or the stamp. In other embodiments, the shell design may depend upon the type(s) of hard candy used to form the shell and the manner in which it is deposited in the mold. For example, a single molten hard candy source can be introduced into the mold by a nozzle to produce a solid appearance. Alternatively, two or more molten hard candies introduced together can be used to form a shell having a side by side or starlight pattern. For example, the exterior of a stamped shell may include a starlight pattern employing a first high boiled caramel and a second high boiled caramel to which a different color has been added.

The shape and size of the shell can vary based on the size of the particular confectionery desired to be made. In one embodiment, the confectionery is designed as a bite sized candy, the shell having a diameter at its opening of about 20 mm to 30 mm, for example, although other sizes and shapes, such as bars, are contemplated. Furthermore, while illustrated and discussed with respect to a semi-spherical or dome shaped shell, any geometry may be employed for which a mold and corresponding stamp can be formed. Thus, for example, a rectangular shell of a size corresponding to a more traditional candy bar can also be formed and used in conjunction with exemplary embodiments.

Regardless of the shell size, the thickness of the shell is preferably controlled to provide a thin candy shell so that the confectionery can be consumed by biting through the hard candy or other cooked sugar composition without pain or risk of injury to the teeth, while also being thick enough to resist leakage in the event of regions of unintended variation in shell thickness during manufacture. Accordingly, while the thickness may vary, the shell thickness is typically between 0.5 and 3 mm, more typically in the range of 1.0 to 2 mm, and in one embodiment the thickness is between 1.1 and 1.7 mm. The ability to generate hard candy shells of such thin walls that still support a filling was surprising.

The stamped shell enables an engineered shell thickness, so that by design of the stamping tool and mould a desired shell thickness is consistently maintained, typically within ±0.2 mm. Filled hard candies made using traditional high speed forming have thicker shells, typically in the 2-4 mm range and easily vary ±0.5 mm. One-shot deposited filled hard candies also have an average thicker shell, 1.5-7.9 mm, and even greater variability of shell thickness, ±1.5 mm. The tremendous variability in shell thickness of the traditional high speed forming and one-shot depositing processes do not allow for a consumer to confidently bite through the confectionery without risk of injury to the teeth, which is overcome by, and yet another advantage of, exemplary embodiments.

The ability to create a thin shell while still protecting the internal filling permits bite-sized pieces to be created with a much higher fill percentage than is currently known. Exemplary embodiments contain at least about 30% by weight, typically at least about 40% by weight, and preferably in the range of about 40% to about 70% by weight filling.

Any filling can be dispensed into the shell cavity (or into the mold, for embodiments in which a shell is omitted). Dispensing of the filling composition is typically, but not necessarily, carried out while the shells are still in the mold. The filling can be a single deposit of a confectionery fat mass, a fruit based mass, a water-based cooked sugar mass, a sugar free based mass, a powder, an inclusion, any other composition, or a combination thereof. Confectionery fat masses include, but are not limited to, compound, chocolate, pastes (e.g., cookies and cream paste), chocolate crème, nut butters (e.g., peanut butter, almond butter, hazelnut butter, etc.), praline filling, or a combination thereof. Fruit based masses include, but are not limited to, jelly, jam, purees, preserves, or a combination thereof. The water-based cooked sugar masses include, but are not limited to, gummies, jellies, fondants, syrups, caramels, soft chews, or a combination thereof. Sugar free based masses include, but are not limited to, isomalt, xylitol, maltitol, or a combination thereof. The powders include, but are not limited to, sugar, starch-based, sugar free, or a combination thereof. Any of the foregoing may also contain inclusions that include, but are not limited to, cookie bits, nuts, crisped rice, sprinkles, etc.

In accordance with a preferred embodiment, the filling is a co-deposit of two different materials of contrasting texture that are commingled and form a laminate-type center. Suitable laminate-type centers include any co-deposition of a hard candy and a confectionery mass, preferably a fat-based composition, but can be any non-hard candy mass capable of being co-deposited with a hard candy as described herein. For example, confectionery masses for a co-deposit filling include, but are not limited to, crème, a chew, a confectionery fat mass, a fruit based mass, or a combination thereof. Examples of co-deposited or comingled masses include, but are not limited to, caramel hard candy combined with a non-tempering compound.

In one embodiment, a co-deposit filling is dispensed as a commingling of a molten hard candy composition and a fat-based component. The hard candy composition may be the same or different as the cooked sugar mass employed for the stamped shell (if any). The fat-based component can be any fat-based composition, but is preferably based on non-tempering fats to avoid blooming in light of the high processing temperatures during co-deposition. Exemplary compositions for use as the fat-based component of the co-deposited filling include those referred to in the confectionery art as "compound," which employ solid fats known as cocoa-butter replacements or cocoa-butter substitutes. Examples of such fats include by way of example only, palm oil, palm kernel oil, blends of palm and palm kernel oil, blends of shea butter and/or illipe butter with fractions of palm oil, such as those products sold under the tradenames Choclin, Coberine, Palmy MMSE, Palmy MM78, Tintoretto, and Illexao, and combinations thereof. The types of compound used include white compound, chocolate compound, caramelized white compound, or any other flavoring of compound desired to be included in the taste profile of the filling.

The fat-based or other confectionery mass co-deposited with the hard candy to create a commingled, laminate type product can be of any desired recipe provided it can be suitably processed in conjunction with the molten hard candy used for the filling which is generally at a much higher temperature. The fat-based component thus should be capable of being deposited at temperatures of between 60 and 120° C., preferably between 85 and 105° C., and more preferably between 90 and 100° C. This can be accomplished by formulating the fat-based component to a viscosity range, at the elevated deposition temperature, in the range of about 1,000 cP and 7,500 cP, preferably between 1,100 cP and 2,500 cP. In order to eliminate moisture release during co-deposition, the moisture content of the fat-based component used in the filling is generally in the range of between 0.5 and 1.2% (w/w), preferably between 0.5 and 0.75% (w/w). The fat-based component of a filling for co-deposition should include about 5 to 8% by weight milk protein or less.

In some embodiments, the fat-based component is initially prepared in a fashion typical of a compound chocolate, whereby the sugar content is refined with the fat phase to a desired particle size, then conched and standardized to a final desired fat level. The conching decreases the moisture content of the fat-based component.

The desired particle size after refining is typically between 17 to 65 µm, preferably 30 to 50 µm, and more preferably about 35 µm. The fat content of the fat-based component is typically between 20 and 45% (w/w), preferably between 24 and 38% (w/w), and more preferably between 25 and 26% (w/w). In one embodiment, the fat-based component includes between 45 and 65% by weight sugars and/or carbohydrates, between 24 and 38% by weight fats, between 12 and 16% by weight condensed or evaporated milk or cream, which may be present as milk powder, between 0.05 and 0.2% by weight salt, and a balance of additives. As previously noted, the fat-based component preferably includes 5 to 8% by weight or less milk proteins and a moisture content of less than 1%.

An emulsifier such as lecithin may also be employed to assist in high temperature processing to yield the fat-based component or other confectionery mass to be co-deposited having the desired viscosity. Lecithin is typically up to about 1% by weight, more typically from about 0.5 to about 0.9 percent by weight of the fat-based component.

The sugars and/or carbohydrates used in the fat-based component include, but are not limited to, sucrose, lactose, maltose, and/or maltodextrin. The fats include, but are not limited to, lecithin, anhydrous milk fat, and/or oils such as palm oil, palm kernel oil, or coconut oil. The additives include, but are not limited to, preservatives and/or powdered colors and flavorants.

With a co-deposited filling, the ratio of the hard candy mass to the fat-based component can vary depending upon the desired recipe. Typically, the filling includes, by volume, at least 30% of the fat-based component, preferably between at least 40% up to about 70% of the fat-based component. However, the filling is not so limited and may include hard candy mass to fat-based component ratios of between 1:5 and 4:1 or beyond. In one embodiment, the volume ratio of hard candy mass to fat-base component is about 2:3. Other embodiments include ratios of between 2:1 and 1:2.

It will be appreciated that the term co-deposit is not intended to limit the filling to a combination of only two components and that in some embodiments, for example, two different fat-based components may be employed together with a hard candy composition for a co-deposited filling having three members.

Despite the hard candy mass, which is at a substantially higher temperature than the fat-based component when the hard candy is in its molten state for processing, the two components are still capable of being co-deposited, partially as a result of the formulations having the desired viscosity and moisture characteristics provided as well as being thermally isolated within the depositor until at or just before the discharge point from which the co-deposit is dispensed.

The viscosities of the hard candy mass and the fat-based component are matched or substantially matched, such that they are within about 3,000 cP of each other, and preferably within about 1,500 cP of each other, at the co-deposition temperature. The depositor includes at least two separate hoppers, each of the hoppers having an independently actuable piston. In a further embodiment, the discharge point, or nozzle, may include a nozzle plate. The nozzle plate establishes the manner in which the two components are co-mingled and may include side by side, starlight, multiple spaghetti nozzles, honeycomb, etc. Such nozzle plates are known in the art for co-depositing like materials in traditional hard candy manufacture. While not originally intended for this purpose, depositors capable of creating a commingled hard candy and fat-based component co-deposit in accordance with the embodiments described herein are commercially available, such as those manufactured by Winkler and Dünnebier Süßwarenmaschinen GmbH of Rengsdorf, Germany. In some embodiments, layers can be made or enhanced by spinning the nozzle, regardless of the nozzle type.

The shells (or mold cavity if no shell is employed) is filled vertically, typically at a distance of 25 to 100 mm, preferably between 50 and 90 mm, and more preferably between 55 and 75 mm from the nozzle outlet down to the substrate (e.g., shell or mold) on which the filling composition is being deposited. As a result, the co-deposit filling stretches and twists by the pull of gravity, creating thinner sections of hard candy and fat masses. As the filling overlaps on itself during deposition, which may be enhanced by vibration of the shell contemporaneous with co-deposition (i.e. during or immediately thereafter while still hot enough to flow), the alternating layers of the hard candy and fat-based component begin to overlie one another in a more horizontal manner, creating a laminate-type arrangement and texture upon cooling.

Once filled, the shell is typically closed. However, in some cases leaving the pieces open with the filling still visible may be desired. Closure may be accomplished by depositing a small volume of a closure mass, again in a molten or pliable form that thereafter cools. In one embodiment, the closure mass is a cooked sugar mass, typically, but not necessarily, of the same composition used for the shell. Because the closure mass can be applied after the filling composition has cooled, tempering fats and other materials may also be used as a closure mass with less risk of blooming than if used in other aspects of the invention. Other suitable masses for closing the shell include, but are not limited to, compound chocolate, tempered chocolate, and/or edible wax. The closure mass covers the filling and seals the interior of the shell. As with the shell, any design or style may be deposited, including a starlight design of two or more different colors of hard candy or fat masses. In embodiments in which no shell is employed and the filling composition is deposited directly into the mold, a closure mass may still be employed overlying the filling composition.

The confectionery is removed from the mold and may be considered a finished product. It will be appreciated however, that in some embodiments the confectionery may be enrobed with chocolate or other coatings after removal from the mold.

According to some exemplary embodiments, the resulting confectionery has a thin hard candy shell that can easily be bitten into. Because the cooled hard candy portions of the filling turn hard and brittle, while the fat-based components remain soft, biting through the hard candy shell reveals a dual-texture filling that approximates that of a traditional laminate confectionery made with traditional laminate extrusion machines—but which traditional methods could not be employed to form centers within a shell of engineered thickness.

Exemplary embodiments are further described and illustrated with respect to the following examples which are presented by way of explanation, not of limitation.

EXAMPLES

Example 1

A confectionery in accordance with an exemplary embodiment was formed as a bite size piece (20 mm inner diameter hemispherical shape and weight 7.5 g+/−0.5 g) formed in a Teflon coated aluminum mold with ejection pin.

The piece included a stamped shell of cooked sugar mass, formed in the manner described herein. The cooked sugar mass was a milk-containing high boil (caramel hard candy) of 3.4% to 3.9% by weight final moisture. The shell had an engineered shell thickness of 1.7 mm.

The shell was filled with a laminate-like co-deposit of the same milk-containing high boil co-deposited with white compound using a depositor obtained from Winkler and Dünnebier Süßwarenmaschinen GmbH. The volume ratio of high boil candy mass to white compound in the co-deposit was 2:3. Subsequent examination showed the co-deposit filling was observed as having formed with many layers to provide a munchable, "typical laminated" type texture.

Finally, a deposit of the same high boil was placed on the top of the filling to provide closure of the piece. The thickness of the final deposit was carefully controlled to provide a minimum thickness that enabled biting the piece.

Example 2

A confectionery in accordance with an exemplary embodiment was formed as a bite size piece in a Teflon coated aluminum mold with ejection pin. The bite size piece had a weight of 7.5 g+/−0.5 g, and included a 2.6 g stamped shell of cooked sugar mass having a 20 mm inner diameter hemispherical shape, formed in the manner described herein.

The cooked sugar mass was a fruit flavored hard candy formed from sugar, water, glucose syrup, and sorbitol to a 3.4% by weight moisture content. The shell had an engineered shell thickness of 1.7 mm and was filled with a 3 g mono-deposit of a soft fruit chew composition.

Some of the shells were left open, while others were closed with a closure mass placed on the top of the filling to provide closure of the piece. The closure mass included a 2 g deposit of the same fruit flavored hard candy at 3.9% by weight moisture. The thickness of the final deposit was carefully controlled (via heat and vibration) to provide a minimum thickness that enabled biting the piece.

Example 3

A confectionery in accordance with an exemplary embodiment was formed as a bite size piece in a polycarbonate chocolate mould. The mould included an embossed design which created an engraving on the top of the product. The bite size piece had a weight of 9.0 g+/−0.2 g, and included a 2.0 g stamped shell of cooked sugar mass having a 30 mm diameter curved disk shape with a height of 8 mm, formed in the manner described herein.

The cooked sugar mass was a milk-containing high boil (caramel hard candy) of 3.6% by weight final moisture. The shell had an engineered shell thickness of 1.1 mm, and was filled with a 4 g co-deposit of comingled layers of the same caramel hard candy and a white compound paste.

Finally, a 3 g deposit of the same caramel hard candy at 3.5% by weight moisture was placed on the top of the filling to provide closure of the piece. The thickness of the final deposit was carefully controlled (via heat and vibration) to provide a minimum thickness that enables biting the piece.

Example 4

A confectionery in accordance with an exemplary embodiment was formed as a bite size piece in a silicone mould. The bite size piece had a weight of 6.7 g+/−0.5 g, and included a 3.0 g stamped shell of a soft caramel crème.

The soft caramel crème was cooked to 6.2% by weight final moisture and was filled with a mono-deposit of 2 to 2.5 g of strawberry fruit preserves. A 1.5 g deposit of the soft caramel crème at 8.3% by weight moisture was then placed on the top of the filling to provide closure of the piece. The thickness of the final deposit was carefully controlled (via heat and vibration) to provide a similar shell thickness to that of the shell thickness.

Example 5

A confectionery in accordance with an exemplary embodiment was formed as a bite size piece in a metal hard candy mould with ejection pin. The mould geometry was a 24 mm diameter curved disc shape with a height of 11.5 mm. The bite size piece was formed by under filling the mould and included a 1.0 g±0.2 g stamped shell of an isomalt mass.

The isomalt mass was a isomalt:hydroxypropylcellulose (HPC) blend cooked to 1.6% by weight final moisture, and included isomalt, HPC polymer (prehydrated in water), and peppermint flavor duraromes. The shell had an engineered shell thickness of 1.7 mm and was filled with 1 to 2 g of flavored xylitol.

Example 6

A confectionery in accordance with an exemplary embodiment was formed as a bite size piece in a silicone mould. The bite size piece had a weight of 6.0 g+/−0.5 g, and included a 2.5 g stamped shell of a soft vanilla crème.

The soft vanilla crème was cooked to 7.5% by weight final moisture and filled with comingled layers of the same vanilla crème and caramel hard candy used in Example 3 at a volume ratio of 40:60 caramel hard candy:vanilla crème. In some of the shells used in Example 6, the comingled deposit weight was 2 g±0.2 g followed by a deposit of the vanilla crème for closure to form a full shell product. In other shells, the comingled deposit weight was 3.4 g±0.2 g to fill the shell cavity entirely and produce an open shell product with the layers of the co-deposit visible on one side of the product.

Example 6A

A third variant was used in which 6.0 g±0.2 g deposit of the composition of comingled filling layers of Example 6 was co-deposited directly into the silicone mould cavity to produced a laminate-only product without any shell.

Example 7

A confectionery in accordance with an exemplary embodiment was formed as a bar using a polycarbonate chocolate mould. The piece included a stamped shell of formed of the caramel hard candy used in Example 3.

The shell was filled with comingled layers of the same caramel hard candy and a cocoa-butter substitute (CBS) based fat mass containing about 37.5% by weight total fat co-deposited in the same manner as described.

Example 8

A confectionery in accordance with an exemplary embodiment was formed as a bite size piece in a silicone mould. The bite size piece had a weight of 4.5 g+/−0.2 g, and included comingled layers of caramel hard candy (Example 3) and CBS fat mass (same as Example 7). The caramel hard candy was cooked to 3.4% by weight final moisture. As in Example 6A, the comingled layers of the filling composition were co-deposited directly into the mould without a shell. The volume ratio of hard candy to fat mass was 2:1.

Example 9

A confectionery in accordance with an exemplary embodiment was formed as a bite size piece in a silicone mould. The piece was composed of comingled layers of caramel hard candy (Example 3) and a dark chocolate composition formed in the manner described herein. As with Example 8, the composition was deposited directly into the mold cavity without the use of a shell; the volume ratio of hard candy to dark chocolate was 1:2. While good layering was observed with respect to the two components of the co-deposit, significant blooming was also observed in the chocolate.

Example 10

A confectionery in accordance with an exemplary embodiment was formed as a bite size piece in a Lexan plastic mould. The bite size piece had a weight of 5.4 g±0.2 g and included 24 mm diameter curved disc shape with a height of 11.5 mm.

The bite size piece included comingled layers of caramel hard candy and a non-tempering CBS creme. The two masses were co-deposited at a volume ratio of 1:1 in comingled layers through a 2×6 starlight nozzle at an elevated height between 70 and 75 mm above the mould to enable swirling during the deposit. The composition was co-deposited directly into the mould to create a confectionery that was free of a shell.

Example 11

A confectionery in accordance with an exemplary embodiment was formed as a bite size piece in a Lexan plastic mould. The bite size piece had a weight of 5.1 g±0.4 g, and included a 24 mm diameter curved disc shape having a height of 11.5 mm.

The bite size piece included a 1.9 g±0.2 g stamped shell of cooked sugar mass, formed in the manner described herein. The cooked sugar mass was the caramel hard candy used in Example 3. The shell had an engineered shell thickness of 1.5 mm and was filled with 3.2 g±0.2 g mono-deposit of a fat-based crème.

Example 12

A confectionery in accordance with an exemplary embodiment was formed as a bite size piece in a Lexan plastic mould. The bite size piece had a weight of 5.1 g±0.4 g, and included a 24 mm diameter curved disc shape having a height of 11.5 mm.

The piece included a 1.9 g±0.2 g stamped shell of caramel hard candy, formed in the manner described herein. In this example the stamping tool was specially designed to include a chamfer at the top of the tool resulting in a finished look with minimal hard candy shell ring visible at the top of the product.

The shell had an engineered shell thickness of 1.5 mm and was filled with 3.2 g±0.2 g of comingled layers of the caramel hard candy and non-tempering CBS crème. The two masses were deposited at a volume ratio of 2:1 creme:hard candy in comingled layers through a 2×6 starlight nozzle at an elevated height of 70-75 mm above the mould to enable swirling during the deposit.

Example 13

A confectionery in accordance with an exemplary embodiment was formed as a bite size piece in a Lexan plastic mould. The bite size piece had a weight of 5.1 g±0.4 g, and included a 24 mm diameter curved disc shape having a height of 11.5 mm.

The bite size piece included a shell filled with the composition of comingled filling layers of Example 12. The comingled masses were deposited at a ratio of 2:1 creme: hard candy to a filling weight of 3.2 g±0.2 g.

Finally, the under-filled mould cavity was filled with tempered milk chocolate, scraped, cooled, and demoulded to produce a two layer product. The two layer product had a glossy premium top surface, comingled layers of hard candy and crème, and a consumer pleasing layer of chocolate on the bottom.

Example 14

A confectionery in accordance with an exemplary embodiment was formed as a bite size piece in a metal hard candy mould with ejection pin. The bite size piece included a 24 mm diameter curved disc shape having a height of 11.5 mm.

The bite size piece included a stamped shell of caramel hard candy with 5% by weight chopped almonds (16 mesh). The addition of the chopped almonds created a croquant-like product and a more wafer-like textured shell with reduced tooth-packing. The shell was filled with a mono-deposit of a coconut oil CBS.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming a confectionery product comprising:
providing a first confectionery mass of a molten hard candy composition;
providing a second confectionery mass of a non-hard candy composition;
contacting the first confectionery mass in a molten state and the second confectionery mass at a nozzle outlet to form a combined stream, the first confectionery mass being at a first temperature and having a first viscosity and the second confectionery mass being at a second temperature in the range of 60° C. to 120° C. and having a second viscosity within 1500 cP of the first viscosity; then
vertically filling a cavity by co-depositing the first and second confectionery masses as the combined stream into the cavity to form a laminate of alternating overlapping layers of the confectionery masses;
cooling the co-deposited masses in the cavity to form the confectionery product; and
removing the confectionery product from the cavity.

2. The method of claim 1, wherein the cavity is a mold and the confectionery product is free of a shell.

3. The method of claim 1, wherein the cavity is a cooked sugar confectionery shell.

4. The method of claim 3, wherein the cooked sugar confectionery shell is formed by the steps of:
providing a flowable or pliable cooked sugar mass;
depositing the cooked sugar mass into a mold cavity;
inserting a stamp into the cooked sugar mass in the mold cavity to form a shell; and
cooling the cooked sugar mass to harden the shell.

5. The method of claim 1, wherein the second confectionery mass is a fat-based composition.

6. The method of claim 5, wherein the fat-based composition comprises a non-tempering fat.

7. The method of claim 5, wherein the fat-based composition comprises less than 8% by weight milk proteins.

8. The method of claim 1, wherein the second confectionery mass has a viscosity in the range of 1000 cP and 7500 cP at the second temperature.

9. The method of claim 1, wherein the second confectionery mass has a moisture content in the range of 0.5 and 1.2 percent by weight.

10. The method of claim 1, wherein the second confectionery mass comprises less than 5% by weight milk proteins, has a moisture content in the range of 0.5 and 1.2 percent by weight, and a viscosity between 1000 cP and 7500 cP when at the second temperature.

11. The method of claim 1, wherein the step of co-depositing is carried out with a volume ratio of the first confectionery mass to the second confectionery mass in the range of 1:5 to 4:1.

12. The method of claim 11, wherein the volume ratio is in the range of 1:2 to 2:1.

13. The method of claim 1, further comprising the step of vibrating the cavity contemporaneously with the step of co-depositing.

14. The method of claim 1, wherein the step of co-depositing is carried out by expelling the first and second confectionery masses as the combined stream at a height between 25 mm and 100 mm above the cavity.

15. The method of claim 1, wherein the molten hard candy composition comprises nut inclusions.

16. The method of claim 1, wherein the second confectionery mass of a non-hard candy composition has a texture other than a hard candy texture.

17. The method of claim 1 further comprising swirling during the co-depositing.

18. The method of claim 1, wherein the first viscosity is substantially matched with the second viscosity.

19. A confectionery made according to claim 1.

20. A method of forming a confectionery product comprising:
provokdding a flowable or pliable cooked sugar mass;
depositing the cooked sugar mass into a mold cavity;
inserting a stamp into the cooked sugar mass in the mold cavity to form a shell having a shell cavity;
cooling the cooked sugar mass to harden the shell;
providing a first confectionery mass of a molten hard candy composition;
providing a second confectionery mass of a composition of a non-hard candy composition;
combining the first confectionery mass in a molten state and the second confectionery mass to form a combined stream wherein the first confectionery mass being at a first temperature and having a first viscosity and the second confectionery mass being at a second temperature in the range of 60° C. to 120° C. and having a second viscosity within 1500 cP of the first viscosity; then
co-depositing the first and second confectionery masses as a combined stream into the shell cavity to form overlapping layers of the confectionery masses;
cooling the co-deposited masses in the shell to form the confectionery product; and
removing the confectionery product from the cavity.

21. The method of claim 20, wherein the step of cooling the cooked sugar mass is contemporaneous with the step of stamping.

22. The method of claim 20, wherein the cooked sugar mass is selected from the group consisting of hard candy compositions, high boil candy compositions, soft crème compositions, sugar alcohols, soft chews, caramels, and combinations thereof.

23. The method of claim 20 further comprising applying a closure mass over the cooled co-deposited masses.

24. The method of claim 23, wherein the closure mass has a composition identical to that of the shell.

\* \* \* \* \*